United States Patent
Troia et al.

(10) Patent No.: US 11,683,155 B2
(45) Date of Patent: *Jun. 20, 2023

(54) VALIDATING DATA STORED IN MEMORY USING CRYPTOGRAPHIC HASHES

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/591,312

(22) Filed: Feb. 2, 2022

(65) Prior Publication Data

US 2022/0158823 A1    May 19, 2022

Related U.S. Application Data

(63) Continuation of application No. 16/363,100, filed on Mar. 25, 2019, now Pat. No. 11,271,720.

(51) Int. Cl.
*G06F 9/06* (2006.01)
*H04L 9/06* (2006.01)
(Continued)

(52) U.S. Cl.
CPC .......... *H04L 9/0643* (2013.01); *G06F 3/0604* (2013.01); *G06F 3/0619* (2013.01);
(Continued)

(58) Field of Classification Search
None
See application file for complete search history.

(56) References Cited

U.S. PATENT DOCUMENTS

2009/0113558 A1    4/2009   Prabhakaran et al.
2010/0106976 A1    4/2010   Aciicmez et al.
(Continued)

FOREIGN PATENT DOCUMENTS

JP          2004-325761 A    11/2004
JP          2011-501321 A     1/2011
KR     10-2018-0126379 A    11/2018

OTHER PUBLICATIONS

U.S. Appl. No. 15/853,498, entitled, "Physical Unclonable Function Using Message Authentication Code", filed Dec. 22, 2017, 28 pages.
U.S. Appl. No. 16/201,652, entitled, "Parking Infrastructure Powered by a Decentralized, Distributed Database", filed Nov. 27, 2018, 27 pages.
(Continued)

*Primary Examiner* — Scott C Sun
(74) *Attorney, Agent, or Firm* — Brooks, Cameron & Huebsch, PLLC

(57) ABSTRACT

The present disclosure includes apparatuses, methods, and systems for validating data stored in memory using cryptographic hashes. An embodiment includes a memory, and circuitry configured to divide the memory into a plurality of segments, wherein each respective segment is associated with a different cryptographic hash, validate, during a powering of the memory, data stored in each respective one of a first number of the plurality of segments using the cryptographic hash associated with that respective segment, and validate, after the powering of the memory, data stored in a second number of the plurality of segments, data stored in each respective one of a second number of the plurality of segments using the cryptographic hash associated with that respective segment.

19 Claims, 11 Drawing Sheets

| | ADDRESS (416-1) | SIZE (416-2) | GOLDEN HASH (416-3) | VALIDATION STATUS (416-4) | VALIDATION RESULT (416-5) | REMEDIATION ALLOWED (416-6) | REMEDIATION ADDRESS (416-7) | REMEDIATION RESULT (416-8) |
|---|---|---|---|---|---|---|---|---|
| 420-1 | 0x aabbcc | 0x10000 | #1 | Done | Valid | Yes | addr1 | Not Active |
| 420-2 | 0x aa1122 | 0x10000 | #2 | Done | Not Valid | Yes | addr2 | Active |
| | ... | ... | ... | ... | ... | ... | ... | ... |
| 420-3 | 0x 123444 | 0x20000 | #K | Done | Not Valid | No | -- | -- |
| 420-4 | 0x ddeeff | 0x10000 | #K+1 | Not Done | -- | No | -- | -- |
| | ... | ... | ... | ... | ... | ... | ... | ... |
| 420-5 | 0x aa55bb | 0x20000 | #N | Not Done | -- | Yes | addr3 | Not Active |

(51) Int. Cl.
*G06F 21/60* (2013.01)
*G06F 3/06* (2006.01)

(52) U.S. Cl.
CPC .......... *G06F 3/0626* (2013.01); *G06F 3/0659* (2013.01); *G06F 3/0673* (2013.01); *G06F 21/602* (2013.01)

(56) References Cited

U.S. PATENT DOCUMENTS

| | | |
|---|---|---|
| 2010/0174921 A1 | 7/2010 | Abzarian et al. |
| 2012/0320680 A1 | 12/2012 | Sundahl et al. |
| 2014/0351544 A1 | 11/2014 | Abzarian et al. |
| 2015/0324588 A1 | 11/2015 | Locke |
| 2015/0370728 A1 | 12/2015 | Kamada et al. |
| 2016/0246736 A1 | 8/2016 | Lee et al. |
| 2016/0350549 A1* | 12/2016 | Hampel ................. H04L 63/06 |
| 2018/0336140 A1 | 11/2018 | Guddekoppa et al. |
| 2019/0050602 A1 | 2/2019 | Sela et al. |

OTHER PUBLICATIONS

U.S. Appl. No. 15/993,119, entitled, "Transmission of Vehicle Route Information by Passive Devices", filed May 30, 2018, 25 pages.
U.S. Appl. No. 16/034,763, entitled, "Secure Vehicular Communication", filed Jul. 13, 2018, 37 pages.
U.S. Appl. No. 16/034,809, entitled, "Secure Vehicular Services Communication", filed Jul. 13, 2018, 36 pages.
PCT International Application No. PCT/IB2019/000089, entitled, "Method for Improving Safety of a Component or System Running a Firmware or a Finite State Machine", filed Feb. 22, 2019, 42 pages.
International Search Report & Written Opinion from related International Application No. PCT/US2020/022931, dated Jul. 9, 2020, 14 pages.
First Office Action from related Chinese Patent Application No. 202080030593.X, dated May 19, 2022, 31 pages.

* cited by examiner

| ADDRESS | SIZE | GOLDEN HASH | VALIDATION STATUS | VALIDATION RESULT | REMEDIATION ALLOWED | REMEDIATION ADDRESS | REMEDIATION RESULT |
|---|---|---|---|---|---|---|---|
| 0x aabbcc | 0x10000 | #1 | Done | Valid | Yes | addr1 | Not Active |
| 0x aa1122 | 0x10000 | #2 | Done | Not Valid | Yes | addr2 | Active |
| ... | ... | ... | ... | ... | ... | ... | ... |
| 0x 123444 | 0x20000 | #K | Done | Not Valid | No | -- | -- |
| 0x ddeeff | 0x10000 | #K+1 | Not Done | -- | No | -- | -- |
| ... | ... | ... | ... | ... | ... | ... | ... |
| 0x aa55bb | 0x20000 | #N | Not Done | -- | Yes | addr3 | Not Active |

*Fig. 4*

VALIDATING DATA STORED IN MEMORY USING CRYPTOGRAPHIC HASHES

PRIORITY INFORMATION

This application is a continuation of U.S. application Ser. No. 16/363,100, filed on Mar. 25, 2019, the contents of which are incorporated herein by reference.

TECHNICAL FIELD

The present disclosure relates generally to semiconductor memory and methods, and more particularly, to validating data stored in memory using cryptographic hashes.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

Many threats can affect the data stored in the memory cells of a memory device. Such threats can include, for example, faults occurring in the memory device, and/or threats from hackers or other malicious users. Such threats can cause significant financial loss, and/or can present significant safety and/or security issues.

BRIEF DESCRIPTION OF THE DRAWINGS

FIG. 4 illustrates an example of registers used to divide data stored in a memory array into a plurality of segments, and validate and remediate the data stored in each respective segment, in accordance with an embodiment of the present disclosure.

DETAILED DESCRIPTION

Figure 1:
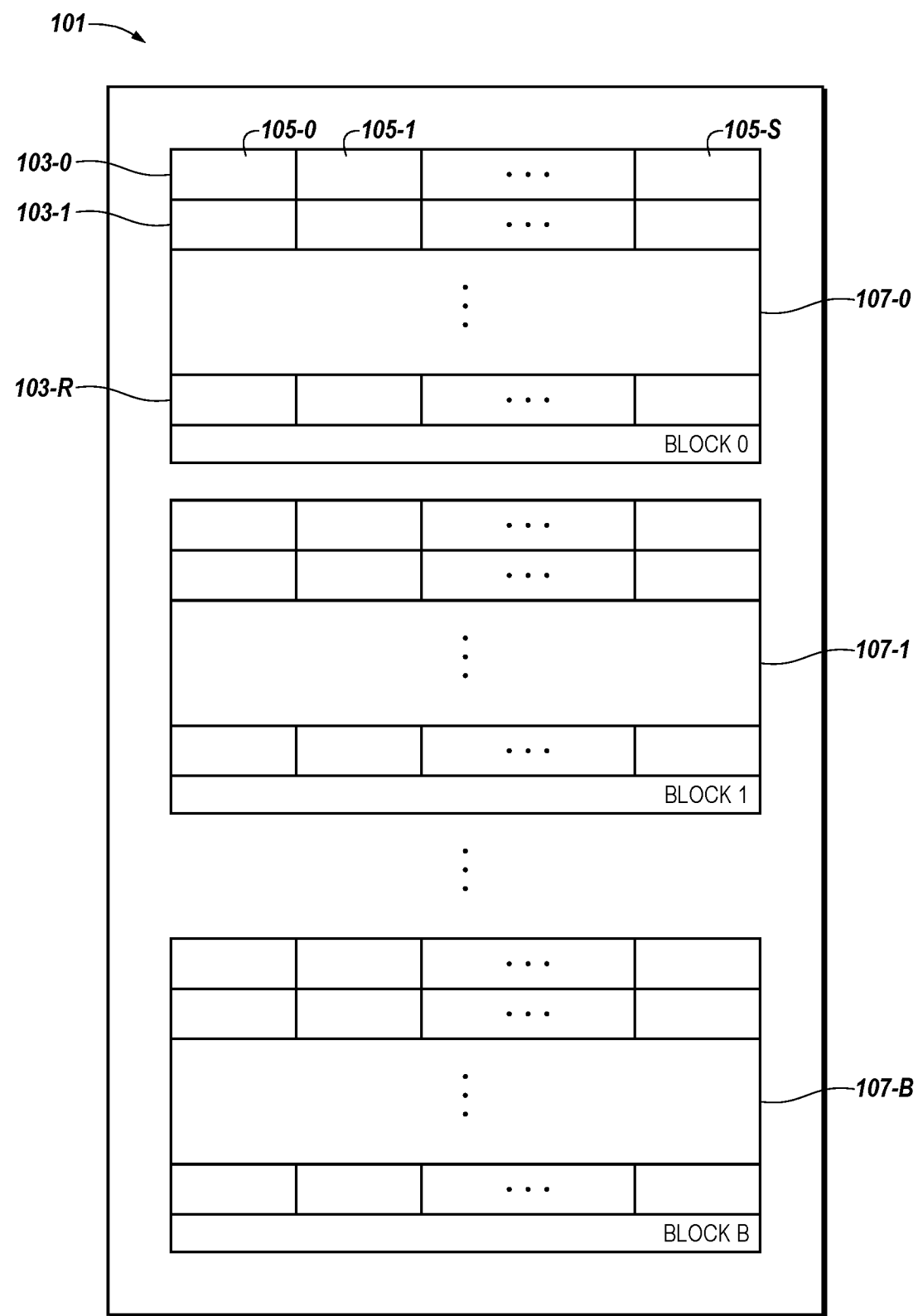
FIG. 1 illustrates a diagram of a portion of a memory array having a number of physical blocks in accordance with an embodiment of the present disclosure.

The present disclosure includes apparatuses, methods, and systems for validating data stored in memory using cryptographic hashes. An embodiment includes a memory, and circuitry configured to divide the memory into a plurality of segments, wherein each respective segment is associated with a different cryptographic hash, validate, during a powering of the memory, data stored in each respective one of a first number of the plurality of segments using the cryptographic hash associated with that respective segment, and validate, after the powering of the memory, data stored in a second number of the plurality of segments, data stored in each respective one of a second number of the plurality of segments using the cryptographic hash associated with that respective segment.

Many threats can affect the data stored in a memory (e.g., in a memory device). For example, faults may occur in the array and/or circuitry of the memory, which can result in errors occurring in the data. As an additional example, a hacker or other malicious user may attempt to perform activities to make unauthorized changes to the data for malicious purposes. For instance, a malicious user may attempt to alter the data stored in a memory in order to adversely affect (e.g., divert the flow of) a commercial transaction being performed using the memory (e.g., to falsely indicate that payment has been made for the service being provided by skipping the code that verifies the payment), a software license check being performed on the memory (e.g., to falsely indicate the software of the memory is properly licensed by skipping the code that verifies the license), or automotive control being performed using the memory (e.g., to skip a check of the genuineness of a part, an environmental check, or a check of a malfunctioning alarm), among other types of hacking activities. Such hacking activities (e.g., attacks) can cause significant financial loss, and/or can present significant safety and/or security issues.

As such, in order to ensure a secure memory system, it is important to validate (e.g., authenticate and/or attest) that the data stored in the memory is genuine (e.g., is the same as originally programmed), and has not been altered by hacking activity or other unauthorized and/or unintended changes. Such data validation may be performed, for instance, during the powering of the memory (e.g., during the powering on and/or powering up of the memory, which may be referred to herein as "booting"). However, the performance of the data validation may increase the amount of time needed to power the memory (e.g., may increase the latency of the boot time), which can adversely affect the user's experience of the memory system.

Embodiments of the present disclosure, however, can effectively validate data stored in memory, and thereby ensure a secure memory system, during a powering of the memory, while reducing the amount of time needed to power the memory (e.g., decreasing the latency of the memory boot time). For instance, embodiments of the present disclosure can divide the memory into segments, and validate the data stored in only a portion (e.g. less than all) of the segments during the powering (e.g., the booting) of the memory, using different cryptographic hashes associated with each respective one of those segments. The data stored in the remaining segments of the memory can then be validated after the powering of the memory has been completed, using different cryptographic hashes associated with each respective one of those segments.

As used herein, "a", "an", or "a number of" can refer to one or more of something, and "a plurality of" can refer to two or more such things. For example, a memory device can refer to one or more memory devices, and a plurality of memory devices can refer to two or more memory devices. Additionally, the designators "R", "B", "S", "N", and "K", as used herein, particularly with respect to reference numerals in the drawings, indicates that a number of the particular feature so designated can be included with a number of embodiments of the present disclosure. The number may be the same or different between designations.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

FIG. 1 illustrates a diagram of a portion of a memory array 101 having a number of physical blocks in accordance with an embodiment of the present disclosure. Memory array 101 can be, for example, a flash memory array such as a NAND flash memory array. As an additional example, memory array 101 can be a resistance variable memory array such as a PCRAM, RRAM, MMRAM, or spin torque transfer (STT) array, among others. However, embodiments of the present disclosure are not limited to a particular type of memory array. Further, memory array 101 can be a secure memory array, as will be further described herein. Further, although not shown in FIG. 1, memory array 101 can be located on a particular semiconductor die along with various peripheral circuitry associated with the operation thereof.

As shown in FIG. 1, memory array 101 has a number of physical blocks 107-0 (BLOCK 0), 107-1 (BLOCK 1), . . . 107-B (BLOCK B) of memory cells. The memory cells can be single level cells and/or multilevel cells such as, for instance, two level cells, triple level cells (TLCs) or quadruple level cells (QLCs). As an example, the number of physical blocks in memory array 101 may be 128 blocks, 512 blocks, or 1,024 blocks, but embodiments are not limited to a particular power of two or to any particular number of physical blocks in memory array 101.

A number of physical blocks of memory cells (e.g., blocks 107-0, 107-1, . . . 107-B) can be included in a plane of memory cells, and a number of planes of memory cells can be included on a die. For instance, in the example shown in FIG. 1, each physical block 107-0, 107-1, . . . 107-B can be part of a single die. That is, the portion of memory array 101 illustrated in FIG. 1 can be a die of memory cells.

As shown in FIG. 1, each physical block 107-0, 107-1, . . . 107-B includes a number of physical rows (e.g., 103-0, 103-1, . . . 103-R) of memory cells coupled to access lines (e.g., word lines). The number of rows (e.g., word lines) in each physical block can be 32, but embodiments are not limited to a particular number of rows 103-0, 103-1, . . . 103-R per physical block. Further, although not shown in FIG. 1, the memory cells can be coupled to columns of sense lines (e.g., data lines and/or digit lines).

As one of ordinary skill in the art will appreciate, each row 103-0, 103-1, . . . 103-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 103-0, 103-1, . . . 103-R comprises one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd numbered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 1, a page of memory cells can comprise a number of physical sectors 105-0, 105-1, . . . 105-S (e.g., subsets of memory cells). Each physical sector 105-0, 105-1, . . . 105-S of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 105-0, 105-1, . . . , 105-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 107-0, 107-1, . . . , 107-B, rows 103-0, 103-1, . . . , 103-R, sectors 105-0, 105-1, . . . , 105-S, and pages are possible. For example, rows 103-0, 103-1, . . . , 103-R of physical blocks 107-0, 107-1, . . . , 107-B can each store data corresponding to a single logical sector which can include, for example, more or less than 512 bytes of data.

Figure 2:
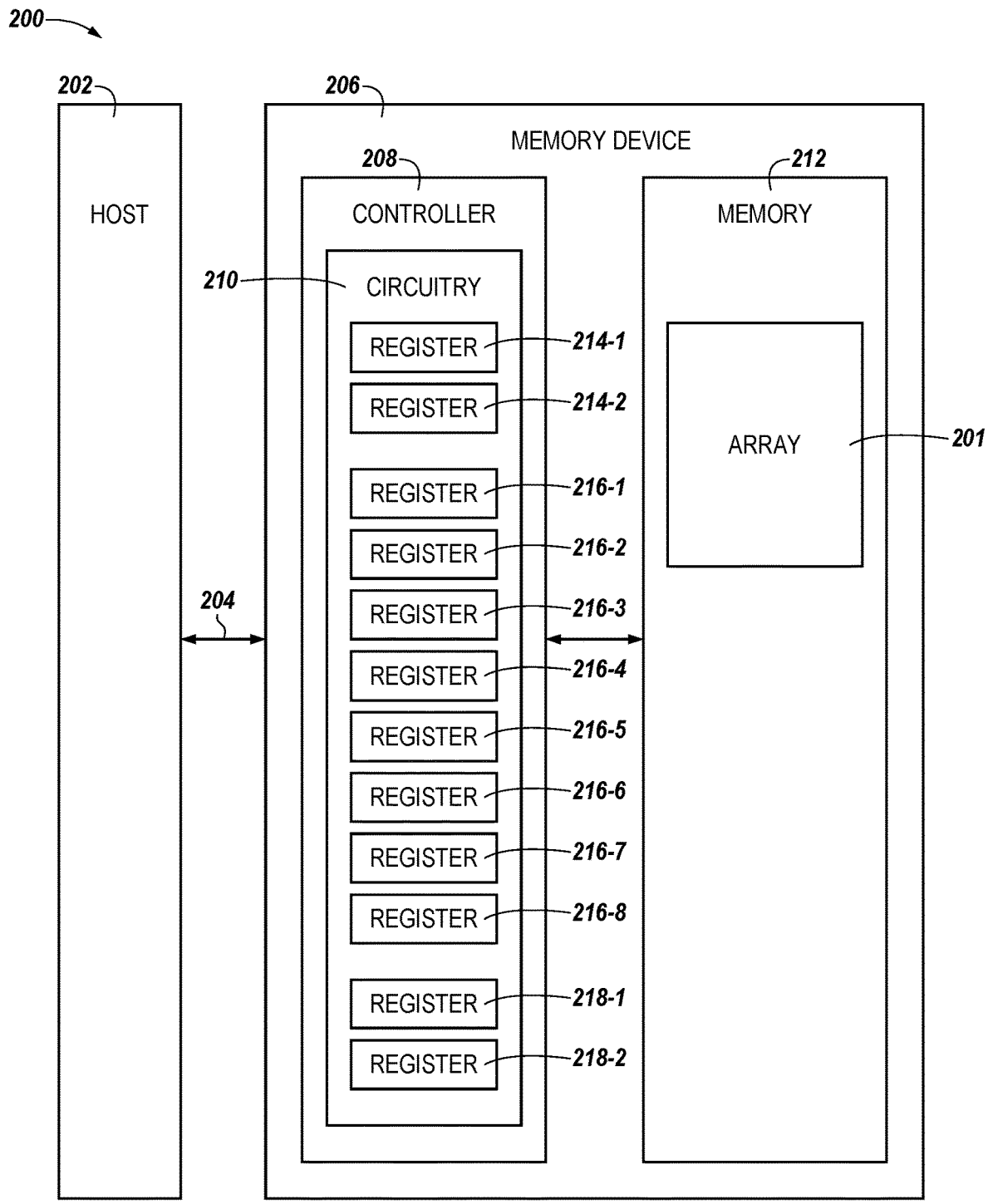
FIG. 2 is a block diagram of a computing system including a host and an apparatus in the form of a memory device in accordance with an embodiment of the present disclosure.

FIG. 2 is a block diagram of a computing system 200 including a host 202 and an apparatus in the form of a memory device 206 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 200 can include a number of memory devices analogous to memory device 206.

In the embodiment illustrated in FIG. 2, memory device 206 can include a memory 212 having a memory array 201. Memory array 201 can be analogous to memory array 101 previously described in connection with FIG. 1. Although one memory array 201 is illustrated in FIG. 2, memory 212 can include any number of memory arrays analogous to memory array 201.

In an embodiment, memory array 201 (e.g., a subset of array 201, or the whole array 201) can be a secure array (e.g., an area of memory 212 to be kept under control). For example, the data stored in memory array 201 can include sensitive (e.g., non-user) data, such as host firmware and/or code to be executed for sensitive applications. In such an embodiment, one or more non-volatile registers can be used to define the secure array. For example, in the embodiment illustrated in FIG. 2, circuitry 210 includes a pair of registers 214-1 and 214-2 that can be used to define the secure array. For instance, register 214-1 can define the address (e.g., the starting LBA of the data) of the secure array, and register 214-2 can define the size (e.g., the ending LBA of the data) of the secure array. An example of such registers, and their use in defining a secure array, will be further described herein (e.g., in connection with FIGS. 3A-3B).

As illustrated in FIG. 2, host 202 can be coupled to the memory device 206 via interface 204. Host 202 and memory device 206 can communicate (e.g., send commands and/or data) on interface 204. Host 202 and/or memory device 206 can be, or be part of, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device or a medical (e.g., implantable and/or health monitoring) IoT enabled device, among other host systems, and can include a memory access device (e.g., a processor). One of ordinary skill in the art will appreciate that "a processor" can intend one or more processors, such as a parallel processing system, a number of coprocessors, etc.

Interface 204 can be in the form of a standardized physical interface. For example, when memory device 206 is used for information storage in computing system 200, interface 204 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, interface 204 can provide an interface for passing control, address, information (e.g., data), and other signals between memory device 206 and a host (e.g., host 202) having compatible receptors for interface 204.

Memory device 206 includes controller 208 to communicate with host 202 and with memory 212 (e.g., memory array 201). For instance, controller 208 can send commands to perform operations on memory array 201, including operations to sense (e.g., read), program (e.g., write), move, and/or erase data, among other operations.

Controller 208 can be included on the same physical device (e.g., the same die) as memory 212. Alternatively, controller 208 can be included on a separate physical device that is communicatively coupled to the physical device that includes memory 212. In an embodiment, components of controller 208 can be spread across multiple physical devices (e.g., some components on the same die as the memory, and some components on a different die, module, or board) as a distributed controller.

Host 202 can include a host controller (not shown FIG. 2) to communicate with memory device 206. The host controller can send commands to memory device 206 via interface 204. The host controller can communicate with memory device 206 and/or the controller 208 on the memory device 206 to read, write, and/or erase data, among other operations. Further, in an embodiment, host 202 can be an IoT enabled device, as previously described herein, having IoT communication capabilities.

Controller 208 on memory device 206 and/or the host controller on host 202 can include control circuitry and/or logic (e.g., hardware and firmware). In an embodiment, controller 208 on memory device 206 and/or the host controller on host 202 can be an application specific integrated circuit (ASIC) coupled to a printed circuit board including a physical interface. Also, memory device 206 and/or host 202 can include a buffer of volatile and/or non-volatile memory and a number of registers.

For example, as shown in FIG. 2, memory device can include circuitry 210. In the embodiment illustrated in FIG. 2, circuitry 210 is included in controller 208. However, embodiments of the present disclosure are not so limited. For instance, in an embodiment, circuitry 210 may be included in (e.g., on the same die as) memory 212 (e.g., instead of in controller 208). Circuitry 210 can comprise, for instance, hardware, firmware, and/or software, and can be used to validate (e.g., authenticate and/or attest) data stored in memory 212 (e.g., in memory array 201).

For example, circuitry 210 can divide the data stored in memory array 201 into a plurality of segments, and associate a different cryptographic hash with each respective segment. For instance, circuitry 210 can generate (e.g., calculate) a different cryptographic hash for each respective segment, using authenticated (e.g., secured) and antireplay protected commands received from host 202 (e.g., so that only memory device 206 knows these cryptographic hashes, and only memory device 206 is capable of generating and updating them). The cryptographic hash generated for each respective segment may be referred to herein as a golden hash for that segment, and can comprise, for instance, a SHA-256 cryptographic hash. These golden hashes may be stored in a non-volatile register 216-3 included in circuitry 210 that is inaccessible to a user of memory device 206 and/or host 202 (e.g., in a "hidden" region of memory device 206), and may be used during the process of validating the data stored in memory array 201, as will be further described herein.

Further, as shown in FIG. 2, circuitry 210 can include one or more non-volatile registers (e.g., registers 216-1 and 216-2) that can be used to define the plurality of segments. For instance, register 216-1 can define the address (e.g., the starting LBA of the data) of each respective one of the plurality of segments, and register 216-2 can define the size (e.g., the ending LBA of the data) of each respective one of the plurality of segments. The plurality of segments can each be the same size (e.g., store the same amount of data), or can be different sizes (e.g., store different amounts of data). An example of registers 216-1, 216-2, and 216-3 will be further described herein (e.g., in connection with FIG. 4).

During a powering (e.g., a powering on and/or powering up) of memory device 206, circuitry 210 can validate (e.g., determine whether to validate) the data stored in each respective one of a first number of the plurality of segments using the golden hash associated with that respective segment. As used herein, validating the data can include, and/or refer to, authenticating and/or attesting that the data is genuine (e.g., is the same as originally programmed), and has not been altered by hacking activity or other unauthorized and/or unintended changes.

For example, circuitry 210 can generate (e.g., calculate) a different run-time cryptographic hash for the data stored in each respective one of the first number of segments, and compare the run-time cryptographic hash generated for the data stored in each respective segment to the golden hash for that respective segment stored in register 216-3. Upon the comparison indicating the run-time cryptographic hash generated for the data stored in a respective segment matches the golden hash for that respective segment, it can be determined that the data stored in that respective segment has not been altered, and therefore the data stored in that respective segment can be validated (e.g., can be determined to be valid). As such, the data stored in each respective segment can be validated independently of the data stored in the other segments.

The first number of the plurality of segments can comprise only a portion (e.g., less than all) of the plurality of segments into which the data stored in memory array 201 is divided. As an example, the first number of the plurality of segments can comprise a particular quantity of segments defined by host 202 (e.g., by a user of host 202). This quantity can be stored in a non-volatile register 218-1 included in circuitry 210. As an additional example, the first number of the plurality of segments can comprise the quantity of segments that can be validated by circuitry 210 in a particular amount of time. This amount of time can correspond to the amount of time for which the powering of memory device 206 lasts, which can be automatically determined by memory device 206 (e.g., by circuitry 210) and stored in a non-volatile register 218-2 included in circuitry 210.

If the comparison, however, indicates the run-time cryptographic hash generated for the data stored in a respective segment does not match the golden hash for that respective segment, this may indicate that the data stored in that respective segment has been changed (e.g., due to a hacker or a fault in the memory), and therefore the data stored in that respective segment may not be valid (e.g., may be determined to not be valid). In such an instance, circuitry 210 can remediate (e.g., attempt to remediate) the data stored in that segment. Remediating the data stored in the segment can include, for instance, determining whether remediation of the data is allowed, and, if remediation is allowed, recovering (e.g., restoring) the data from memory 212 (e.g., from a remediation block included in the memory, such as remediation block 1117 further described in connection with FIG. 11).

As shown in FIG. 2, circuitry 210 can include additional registers 216-4, 216-5, 216-6, 216-7, and 216-8, which can be used by circuitry 210 during the validation and remediation processes. Register 216-4 can be a volatile register that can provide an indication of the status of the validation of the data stored in each respective one of the plurality of segments (e.g., an indication of whether the validation of the data has been done), and register 216-5 can be a volatile register that can provide an indication of the result of the validation of the data stored in each respective segment (e.g., an indication of whether the data has been determined to be valid), which can be used by circuitry 210 to determine whether remediation of the data stored in each respective segment should be attempted.

Register 216-6 can be a non-volatile register that can provide an indication of whether a remediation of the data stored in each respective one of the plurality of segments is allowed, which can be used by circuitry 210 to determine whether remediation of the data stored in a segment is allowed upon a determination that the data is not valid and remediation should be attempted. Register 216-7 can be a non-volatile register that can be used to define the address in memory 212 (e.g., in the remediation block) from which the data stored in each respective one of the plurality of segments can be recovered, which can be used by circuitry 210 to recover the data during a remediation of that data. Register 216-8 can be a volatile register that can provide an indication of the result of the remediation of the data stored in each respective one of the plurality of segments (e.g., whether the data has been remediated) if remediation of that data is allowed. An example of registers 216-4 through 216-8, and their use in the validation and remediation processes, will be further described herein (e.g., in connection with FIG. 4).

After the powering (e.g., booting) of memory device 206 is completed, circuitry 210 can validate (e.g., determine whether to validate) the data stored in each respective one of a second number of the plurality of segments using the golden hash associated with that respective segment. The second number of the plurality of segments can comprise the remaining segments (e.g., the segments that are not included in the first number of the plurality of segments) into which the data stored in memory array 201 is divided. However, embodiments of the present disclosure are not limited to a first and second number of segments (e.g., the plurality of segments can comprise more than the first and second number of segments).

The process of validating the data stored in each respective one of the second number of the plurality of segments can be analogous to the process of validating the data stored in each respective one of the first number of the plurality of segments previously described herein. For example, circuitry 210 can generate a different run-time cryptographic hash for the data stored in each respective one of the second number of segments, and compare the run-time cryptographic hash generated for the data stored in each respective segment to the golden hash for that respective segment stored in register 216-3, in a manner analogous to that previously described herein for the first number of segments. Further, if the data stored in one of the second number of the plurality of segments is determined to not be valid, circuitry 210 can remediate the data stored in that segment, in a manner analogous to that previously described herein for the first number of the plurality of segments. Further, circuitry 210 can use registers 216-4 through 216-8 during the validation and remediation processes for the data stored in the second number of the plurality of segments, in a manner analogous to that previously described herein for the first number of segments.

Further, after the powering of memory device 206 is completed (e.g., while the data stored in the second number of the plurality of segments is being validated), circuitry 210 can send to host 202, via interface 204, the data stored in each respective one of the first number of segments (e.g., host 202 can receive the data from memory device 206) upon the data stored in that respective one of the first number of segments being validated or remediated. For instance, the data stored in each respective one of the first number of segments may not be sent to host 202 if the data stored in that respective segment has been determined to not be valid and has not been remediated; rather, the data stored in each respective segment may only be sent to host 202 if it has been determined to be valid or has been remediated. Circuitry 210 can determine whether the data stored in each respective one of the first number of segments has been determined to valid or has been remediated using registers 216-4 through 216-8, as previously described herein.

After sending the data stored in each respective one of the first number of the plurality of segments, circuitry 210 can send to host 202, via interface 204, the data stored in each respective one of the second number of segments (e.g., host 202 can receive the data from memory device 206) upon the data stored in that respective one of the second number of segments being validated or remediated. For instance, the data stored in each respective one of the second number of segments may not be sent to host 202 if the data stored in that respective segment has been determined to not be valid and has not been remediated; rather, the data stored in each respective segment may only be sent to host 202 if it has been determined to be valid or has been remediated. Circuitry 210 can determine whether the data stored in each respective one of the second number of segments has been determined to valid or has been remediated using registers 216-4 through 216-8, as previously described herein.

The embodiment illustrated in FIG. 2 can include additional circuitry, logic, and/or components not illustrated so as not to obscure embodiments of the present disclosure. For example, memory device 206 can include address circuitry to latch address signals provided over I/O connectors through I/O circuitry. Address signals can be received and decoded by a row decoder and a column decoder, to access memory array 201. Further, memory device 206 can include a main memory, such as, for instance, a DRAM or SDRAM, that is separate from and/or in addition to memory array 201. An example further illustrating additional circuitry, logic, and/or components of memory device 206 will be further described herein (e.g., in connection with FIG. 11).

Figure 3A:
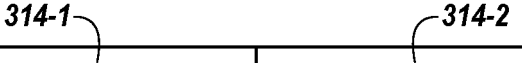
FIG. 3A illustrates an example of registers used to define a secure memory array in accordance with an embodiment of the present disclosure.
Figure 3B:
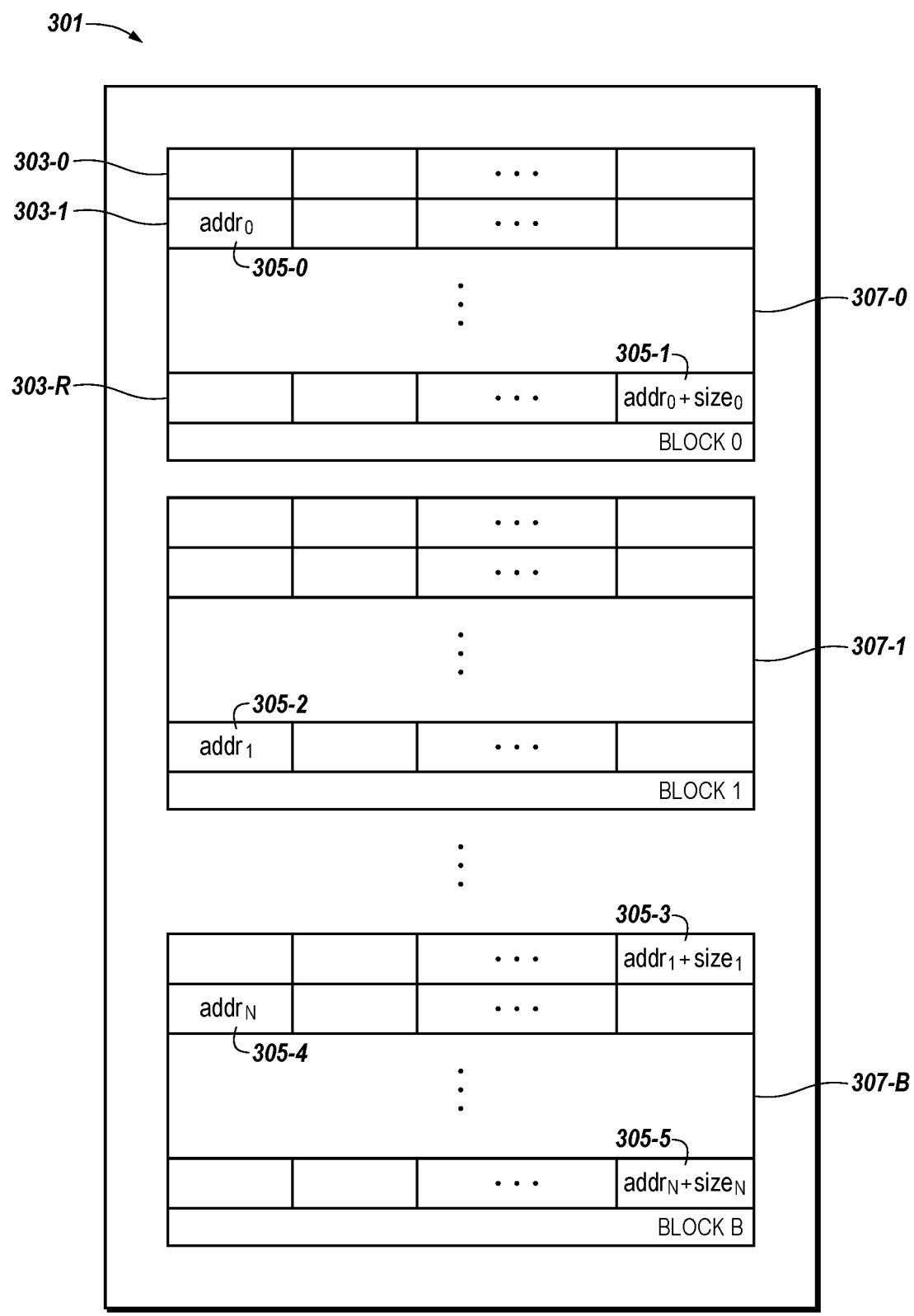
FIG. 3B illustrates a diagram of a portion of a memory array that includes a secure memory array defined in accordance with an embodiment of the present disclosure.

FIG. 3A illustrates an example of registers 314-1 and 314-2 used to define a secure memory array in accordance with an embodiment of the present disclosure, and FIG. 3B illustrates a diagram of a portion of a memory array 301 that includes a secure memory array defined using registers 314-1 and 314-2 in accordance with an embodiment of the present disclosure. Registers 314-1 and 314-2 can be, for instance, registers 214-1 and 214-2, respectively, previously described in connection with FIG. 2, and secure memory array 301 can be, for instance, memory array 201 previously described in connection with FIG. 2. For instance, as shown in FIG. 3B, secure memory array 301 can include a number of physical blocks 307-0, 307-1, . . . , 307-B of memory cells, each including a number of physical rows 303-0, 303-1, . . . , 303-R having a number of sectors of memory cells, in a manner analogous to memory array 101 previously described in connection with FIG. 1.

As shown in FIG. 3A, register 314-1 can define addresses of the secure array (e.g., the addresses of different portions of the secure array), and register 314-2 can define sizes of the secure array (e.g., the sizes of the different portions of the secure array). The addresses of the secure array defined by register 314-1 can correspond to, for instance, starting points (e.g., starting LBAs) of the secure array (e.g., the starting points of the different portions of the secure array), and the sizes of the secure array defined by register 314-2 can correspond to, for instance, ending points (e.g., ending LBAs) of the secure array (e.g., the ending points of the different portions of the secure array).

For example, as shown in FIG. 3A, registers 314-1 and 314-2 can define N pairs of values, with each respective pair comprising an address value (e.g., addr) defined by register 314-1 and a size value (e.g., size) defined by register 314-2. For instance, in the example illustrated in FIG. 3A, $Pair_0$ comprises address value $addr_0$ and size value $size_0$ (e.g., $Pair_0=[addr_0, size_0]$), $Pair_1$ comprises address value $addr_1$ and size value $size_1$ (e.g., $Pair_1=[addr_1, size_2]$), and so on, with $Pair_N$ comprising address value $addr_N$ and size value $size_N$ (e.g., $Pair_N=[addr_N, size_N]$). The address value of a pair can correspond to a starting point (e.g., starting LBA) of a portion of the secure array, and the sum of the address value and the size value of that pair can correspond to the ending point (e.g., ending LBA) of that portion of the secure array. As such, the entire secure array (e.g., the portions that comprise the entire secure array) can be given by: $[addr_0, addr_0+size_0] \cup [addr_1, addr_1+size_1] \cup \ldots \cup [addr_N, addr_N+size_N]$.

The first pair whose size value defined by register 314-2 is zero can stop the definition of the secure array. For instance, in the example illustrated in FIG. 3A, if the size value of $Pair_2$ is zero, then the secure array would be given by: $[addr_0, addr_0+size_0] \cup [addr_1, addr_1+size_1]$.

An example of a secure array defined by registers 314-1 and 314-2 (e.g., with all size values defined by register 314-2 as non-zero) is illustrated in FIG. 3B. For instance, as shown in FIG. 3B, the address (e.g., LBA) associated with sector 305-0 of memory array 301 is $addr_0$, the address associated with sector 305-1 of memory array 301 is $addr_0+size_0$, the address associated with sector 305-2 of memory array 301 is $addr_1$, the address associated with sector 305-3 of memory array 301 is $addr_1+size_1$, the address associated with sector 305-4 of memory array 301 is $addr_N$, and the address associated with sector 305-5 of memory array 301 is $addr_N+size_N$. As such, the secure array comprises sectors (e.g., the data stored in sectors) 305-0 through 305-1, sectors 305-2 through 305-3, and 305-4 through 305-5. However, the sectors of memory array 301 that are before sector 305-0, and sectors 305-1 through 305-2 of memory array 301, are not part of the secure array (e.g., the secure array comprises a subset of array 301).

FIG. 4 illustrates an example of registers 416-1 through 416-8 used to divide data stored in a memory array into a plurality of segments, and validate and remediate the data stored in each respective segment, in accordance with an embodiment of the present disclosure. Registers 416-1 through 416-8 can be, for instance, registers 216-1 through 216-8 previously described in connection with FIG. 2, and the memory array can be, for instance, memory array 201 previously described in connection with FIG. 2.

As shown in the example illustrated in FIG. 4, and previously described herein, the data stored in the memory array can be divided into a plurality of (e.g., N) segments, five of which (e.g., segments 420-1, 420-2, 420-3, 420-4, and 420-5) are illustrated in FIG. 4. Further, as previously described herein (e.g., in connection with FIG. 2), the plurality of segments can comprise a first number of (e.g., K) segments whose data can be validated and/or remediated during a powering of the memory, and a second number of (e.g., N-K) segments whose data can be validated and/or remediated after the powering of the memory. In the example illustrated in FIG. 4, segments 420-1, 420-2, and 420-3 are included in the first number of the plurality of segments, and segments 420-4 and 420-5 are included in the second number of the plurality of segments.

As shown in FIG. 4, register 416-1 can define the address (e.g., address value) of each respective one of the plurality of segments, and register 416-2 can define the size (e.g., size value) of each respective one of the plurality of segments. The address of each respective segment defined by register 416-1 can correspond to, for instance, the starting point (e.g., starting LBA) of that segment, and the size of each respective segment defined by register 416-2 can correspond to, for instance, the ending point (e.g., ending LBA) of that segment. For instance, in the example illustrated in FIG. 4, the address of segment 420-1 is defined by register 416-1 as 0x aabbcc, and the size of segment 420-1 is defined by register 416-2 as 0x10000. Similarly, the addresses of segments 420-2, 420-3, 420-4, and 420-5 are defined by register 416-1 as 0xaa1122, 0x123444, 0xddeeff, and 0x aa55bb, respectively, and the sizes of segments 420-2, 420-3, 420-4, and 420-5 are defined by register 416-2 as 0x10000, 0x20000, 0x10000, and 0x20000, respectively, as illustrated in FIG. 4.

As previously described herein (e.g., in connection with FIG. 2), each respective one of the plurality of segments of data can have a different cryptographic hash (e.g., golden hash) associated therewith for use in validating the data stored in that segment. For instance, in the example illustrated in FIG. 4, segment 420-1 has golden hash #1 associated therewith, segment 420-2 has golden hash #2 associated therewith, segment 420-3 has golden hash #K associated therewith, segment 420-4 has golden hash #K+1 associated therewith, and segment 420-5 has golden hash N associated therewith. As shown in FIG. 4, the golden hash associated with each respective segment can be stored in register 416-3.

As shown in FIG. 4, register 416-4 can provide an indication of (e.g., a value indicating) the status of the validation of the data stored in each respective one of the plurality of segments. In the example illustrated in FIG. 4, the data stored in the first number of the plurality of segments has been validated, but the data stored in the second number of the plurality of segments has not yet been validated (e.g., the powering of the memory is complete, but the validation of the data stored in the second number of segments has not yet been initiated). As such, register 416-4 can provide an indication that the validation of the data stored in segment 420-1 is done, an indication that the validation of the data stored in segment 420-2 is done, an indication that the validation of the data stored in segment 420-3 is done, an indication that the validation of the data stored in segment 420-4 is not done, and an indication that the validation of the data stored in segment 420-5 is not done, as illustrated in FIG. 4.

As shown in FIG. 4, if the validation of the data stored in a segment is done (e.g., as indicated by the value for that segment provided by register 416-4), register 416-5 can provide an indication of (e.g., a value indicating) the result of the validation of the data stored in that segment. In the example illustrated in FIG. 4, register 416-5 is providing an indication that the data stored in segment 420-1 has been determined to be valid, an indication that the data stored in segment 420-2 has been determined to not be valid, and an indication that the data stored in segment 420-3 has been determined to not be valid, as illustrated in FIG. 4. Further, because the data stored in segments 420-4 and 420-5 has not yet been validated (e.g., as indicated by the value for those segments provided by register 416-4), register 416-5 is not providing (e.g., does not include) a value for segment 420-4 or 420-5, as illustrated in FIG. 4.

As previously described herein (e.g., in connection with FIG. 2), if the result of the validation of the data stored in a segment is that the data has been determined not to be valid (e.g., as indicated by the value for that segment provided by register 416-5), the data stored in that segment can be remediated. As shown in FIG. 4, register 416-6 can provide an indication of (e.g., a value indicating) whether a remediation of the data stored in each respective one of the plurality of segments is allowed. For instance, in the example illustrated in FIG. 4, register 416-6 is providing an indication that a remediation of the data stored in segment 420-1 is allowed, an indication that a remediation of the data stored in segment 420-2 is allowed, an indication that a remediation of the data stored in segment 420-3 is not allowed, an indication that a remediation of the data stored in segment 420-4 is not allowed, and an indication that a remediation of the data stored in segment 420-5 is allowed.

As shown in FIG. 4, if remediation of the data stored in a segment is allowed (e.g., as indicated by the value for that segment provided by register 416-6), register 416-7 can define the address (e.g., address value) from which the data stored in that segment can be recovered during the remediation. The address defined by register 416-7 can correspond to, for instance, the location in the remediation block of the memory from which the data can be recovered. For instance, in the example illustrated in FIG. 4, the address from which the data stored in segment 420-1 can be recovered is defined by register 416-7 as addr1, the address from which the data stored in segment 420-2 can be recovered is defined by register 416-7 as addr2, and the address from which the data stored in segment 420-5 can be recovered is defined by register 416-7 as addr3. Further, because remediation of the data stored in segments 420-3 and 420-4 is not allowed (e.g., as indicated by the value for those segments provided by register 416-6), register 416-7 is not defining (e.g., does not include) an address value for segment 420-3 or 420-4, as illustrated in FIG. 4.

As shown in FIG. 4, if remediation of the data stored in a segment is allowed (e.g., as indicated by the value for that segment provided by register 416-6), register 416-8 can provide an indication of (e.g., a value indicating) the result of the remediation. In the example illustrated in FIG. 4, register 416-8 is providing an indication that the data stored in segment 420-1 has not been remediated (e.g., because the data stored in segment 420-1 was determined to be valid, and therefore no remediation of that data would be needed), an indication that the data stored in segment 420-2 has been remediated (e.g., because the data stored in segment 420-2 was determined to not be valid, but is allowed to be remediated), and an indication that the data stored in segment 420-5 has not been remediated (e.g., because the data stored in segment 420-5 has not yet been validated). Further, because remediation of the data stored in segments 420-3 and 420-4 is not allowed (e.g., as indicated by the value for those segments provided by register 416-6), register 416-7 is not providing (e.g., does not include) a value for segment 420-3 or 420-4, as illustrated in FIG. 4.

Figure 5:
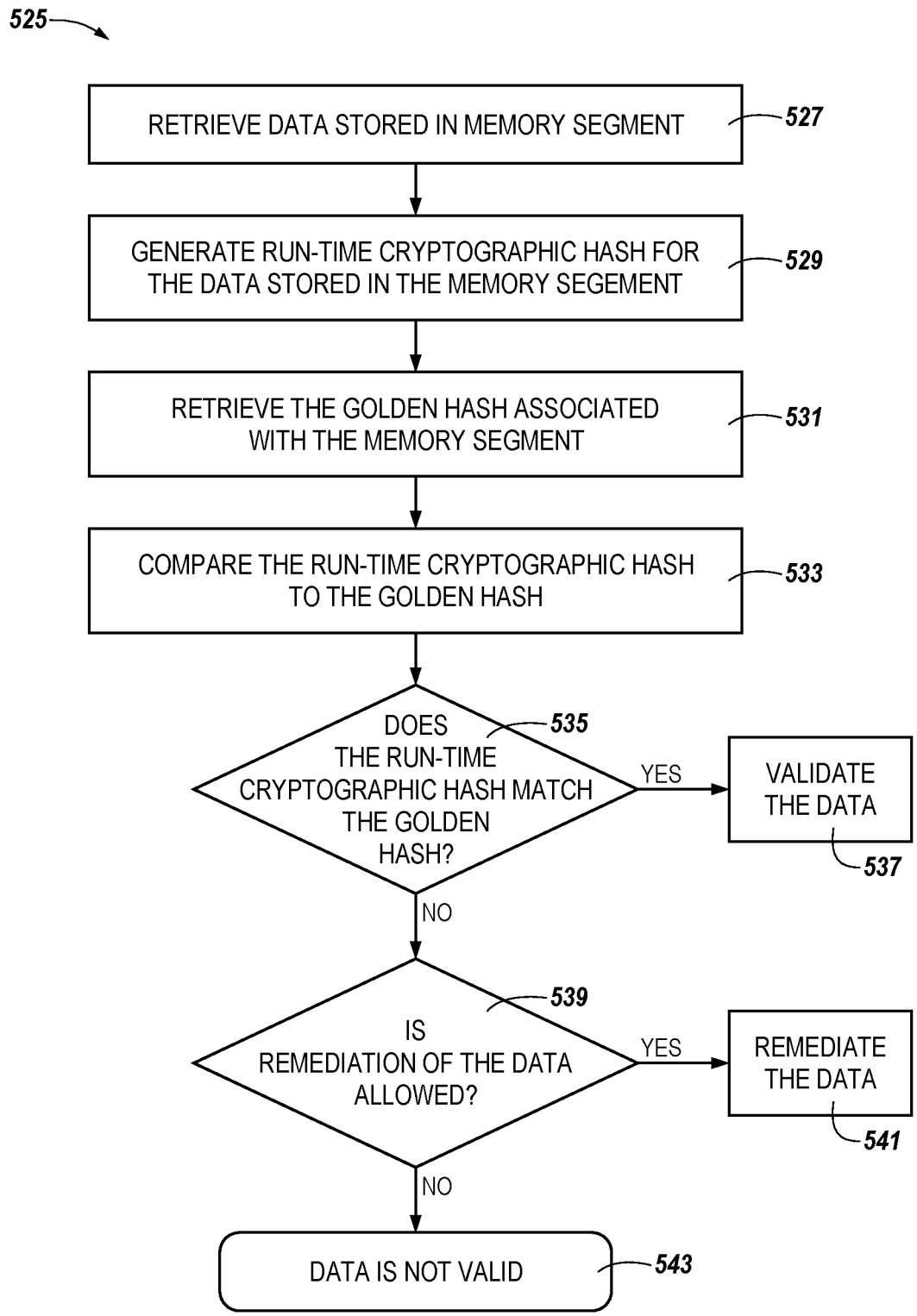
FIG. 5 illustrates a method of validating a segment of data stored in memory using cryptographic hashes in accordance with an embodiment of the present disclosure.

FIG. 5 illustrates a method 525 of validating (e.g., determining whether to validate) a segment of data stored in memory using cryptographic hashes in accordance with an embodiment of the present disclosure. The memory can be, for instance, memory array 201 previously described in connection with FIG. 2, and can be divided into a plurality of segments, as previously described herein. Method 525 can be performed by, for instance, memory device 206 (e.g., circuitry 210) previously described in connection with FIG. 2.

At block 527, method 525 includes retrieving the data stored in one of the plurality of memory segments from the memory. The data stored in the segment can be retrieved using the address and size of that segment defined in registers 216-1 and 216-2, as previously described herein (e.g., in connection with FIG. 2).

At block 529, method 525 includes generating a run-time cryptographic hash for the data stored in the memory segment, and at block 531, method 525 includes retrieving the golden hash associated with the memory segment. The golden hash can be retrieved from register 216-3, as previously described herein (e.g., in connection with FIG. 2).

At block 533, method 525 includes comparing the run-time cryptographic hash to the golden hash, and at block 535, method 525 includes determining whether run-time cryptographic hash matches the golden hash. If it is determined the run-time cryptographic hash matches the golden hash, the data stored in the memory segment is validated (e.g., determined to be valid) at block 537. If it is determined the run-time cryptographic hash does not match the golden hash, method 525 proceeds to block 539.

At block 539, method 525 includes determining whether remediation of the data stored in the memory segment is allowed. The determination of whether remediation of the data stored in the memory segment is allowed can be made using register 216-6, as previously described herein (e.g., in connection with FIG. 2).

If it is determined that remediation of the data stored in the memory segment is allowed, the data is remediated at block 541. The remediation of the data can include recovering the data from the memory using register 216-7, as previously described herein (e.g., in connection with FIG. 2). If it is determined that remediation of the data stored in the memory segment is not allowed, the data stored in the memory segment is not validated (e.g., determined to not be valid) at block 543.

Figure 6:
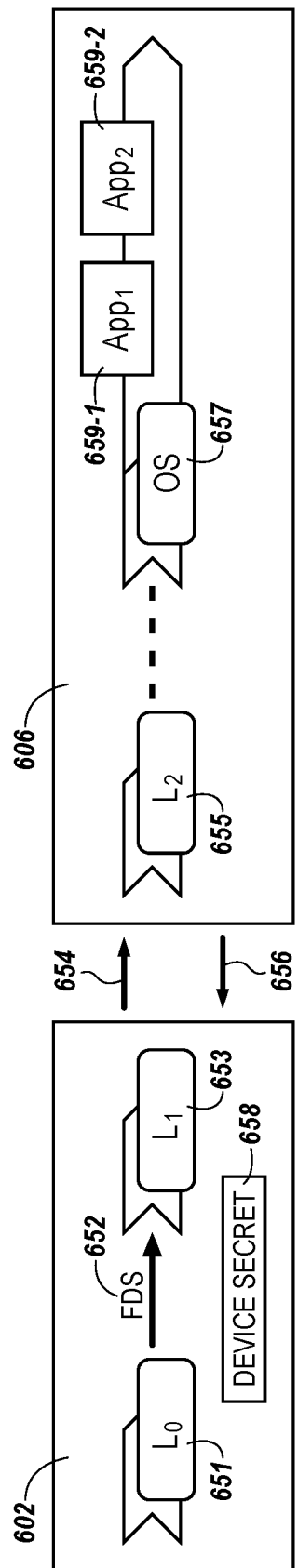
FIG. 6 is a block diagram of an example system including a host and a memory device in accordance with an embodiment of the present disclosure.

FIG. 6 is a block diagram of an example system including a host 602 and a memory device 606 in accordance with an embodiment of the present disclosure. Host 602 and memory device 606 can be, for example, host 202 and memory device 206, respectively, previously described in connection with FIG. 2.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 6, Layer 0 ("$L_0$") 651 and Layer 1 ("$L_1$") 653 are within the host. Layer 0, 651 can provide a Firmware Derivative Secret (FDS) key 652 to Layer 1 653. The FDS key 652 can describe the identity of code of Layer 1 653 and other security relevant data. In an example, a particular protocol (such as robust internet of things (RIOT) core protocol) can use the FDS 652 to validate code of Layer 1 653 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 658 can be used to create the FDS 652 and be stored in memory of the host 602.

The host can transmit data, as illustrated by arrow 654, to the memory device 606. The transmitted data can include an external identification that is public, a certificate (e.g., an external identification certificate), and/or an external public key. Layer 2 ("$L_2$") 655 of the memory device 606 can receive the transmitted data, and execute the data in operations of the operating system ("OS") 657 and on a first application 659-1 and a second application 659-2.

In an example operation, the host 602 can read the device secret 658, hash an identity of Layer 1 653, and perform a calculation including:

$$K_{L1}=KDF[Fs(s),\text{Hash}(\text{"immutable information"})]$$

where $K_{L1}$ is an external public key, KDF (e.g., KDF defined in the National Institute of Standards and Technology (NIST) Special Publication 800-108) is a key derivation function (e.g., HMAC-SHA256), and Fs(s) is the device secret 658. FDS 652 can be determined by performing:

$$FDS=HMAC\text{-}SHA256[Fs(s),SHA256(\text{"immutable information"})]$$

Likewise, the memory device 606 can transmit data, as illustrated by arrow 656, to the host 602.

Figure 7:
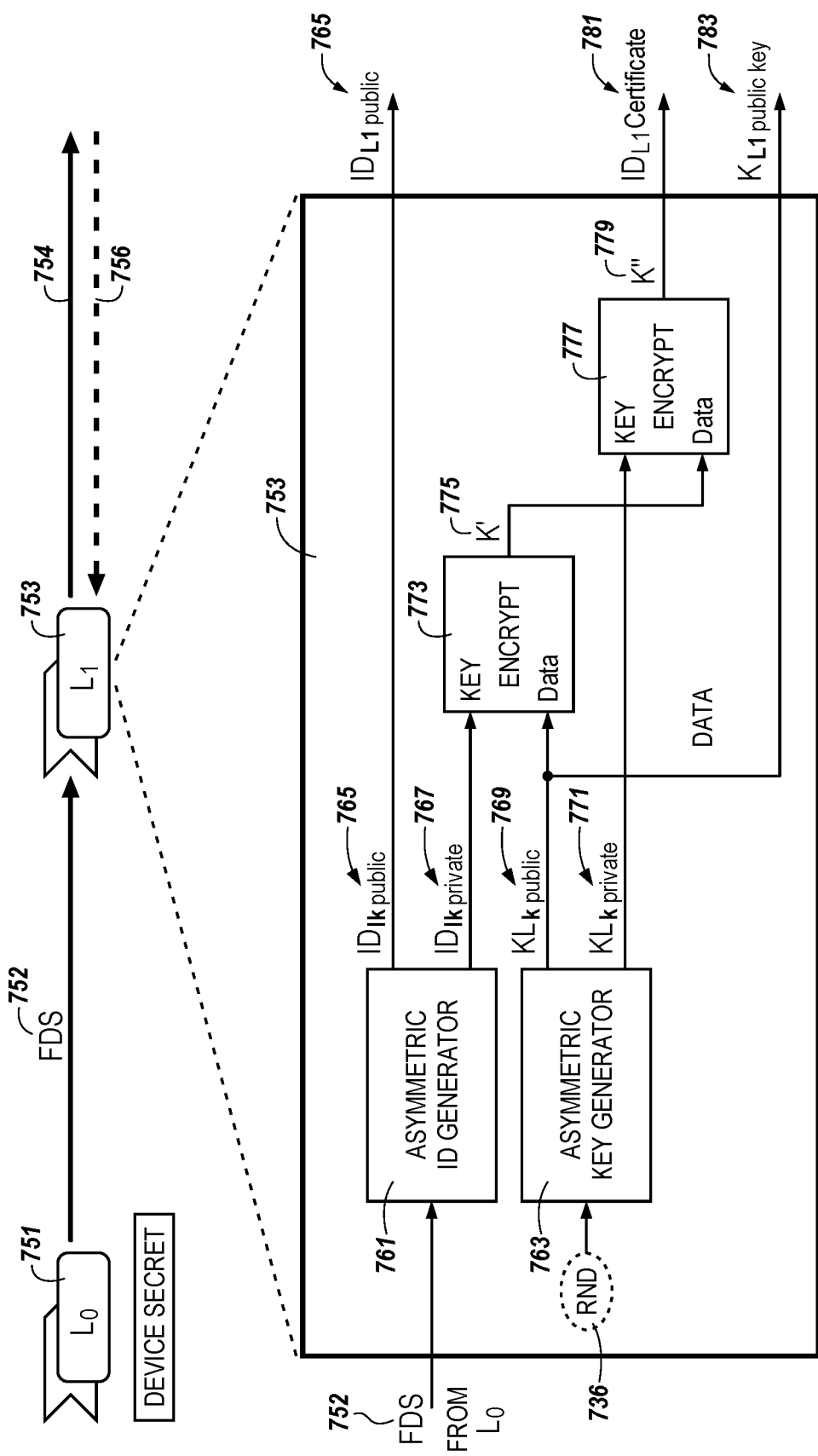
FIG. 7 is a block diagram of an example process to determine a number of parameters in accordance with an embodiment of the present disclosure.

FIG. 7 is a block diagram of an example process to determine a number of parameters in accordance with an embodiment of the present disclosure.

FIG. 7 is an example of a determination of the parameters including the external public identification, the external certificate, and the external public key that are then sent, indicated by arrow 754, to Layer 2 (e.g., Layer 2 655) of a memory device (e.g., 606 in FIG. 6). Layer 0 ("$L_0$") 751 in FIG. 7 corresponds to Layer 0 651 in FIG. 6 and likewise FDS 752 corresponds to FDS 652, Layer 1 753 corresponds to Layer 1 653, and arrows 754 and 756 correspond to arrows 654 and 656, respectively.

The FDS 752 from Layer 0 751 is sent to Layer 1 753 and used by an asymmetric ID generator 761 to generate a public identification ("$ID_{lk\ public}$") 765 and a private identification 767. In the abbreviated "$ID_{lk\ public}$," the "lk" indicates Layer k (in this example Layer 1), and the "public" indicates that the identification is openly shared. The public identification 765 is illustrated as shared by the arrow extending to the right and outside of Layer 1 753 of the host. The generated private identification 767 is used as a key input into an encryptor 773. The encryptor 773 can be any processor, computing device, etc. used to encrypt data.

Layer 1 753 of a host can include an asymmetric key generator 763. In at least one example, a random number generator (RND) 736 can optionally input a random number into the asymmetric key generator 763. The asymmetric key generator 763 can generate a public key ("$K_{Lk\ public}$") 769 (referred to as an external public key) and a private key ("$K_{LK\ private}$") 771 (referred to as an external private key) associated with a host such as host 602 in FIG. 6. The external public key 769 can be an input (as "data") into the encryptor 773. The encryptor 773 can generate a result K' 775 using the inputs of the external private identification 767 and the external public key 769. The external private key 771 and the result K' 775 can be input into an additional encryptor 777, resulting in output K" 779. The output K" 779 is the external certificate ("$ID_{L1\ certificate}$") 781 transmitted to the Layer 2 (655 of FIG. 6). The external certificate 781 can provide an ability to verify and/or authenticate an origin of data sent from a device. As an example, data sent from the host can be associated with an identity of the host by verifying the certificate, as will be described further in association with FIG. 9. Further, the external public key ("$K_{L1\ public\ key}$") 783 can be transmitted to Layer 2. Therefore, the public identification 765, the certificate 781, and the external public key 783 of a host can be transmitted to Layer 2 of a memory device.

Figure 8:
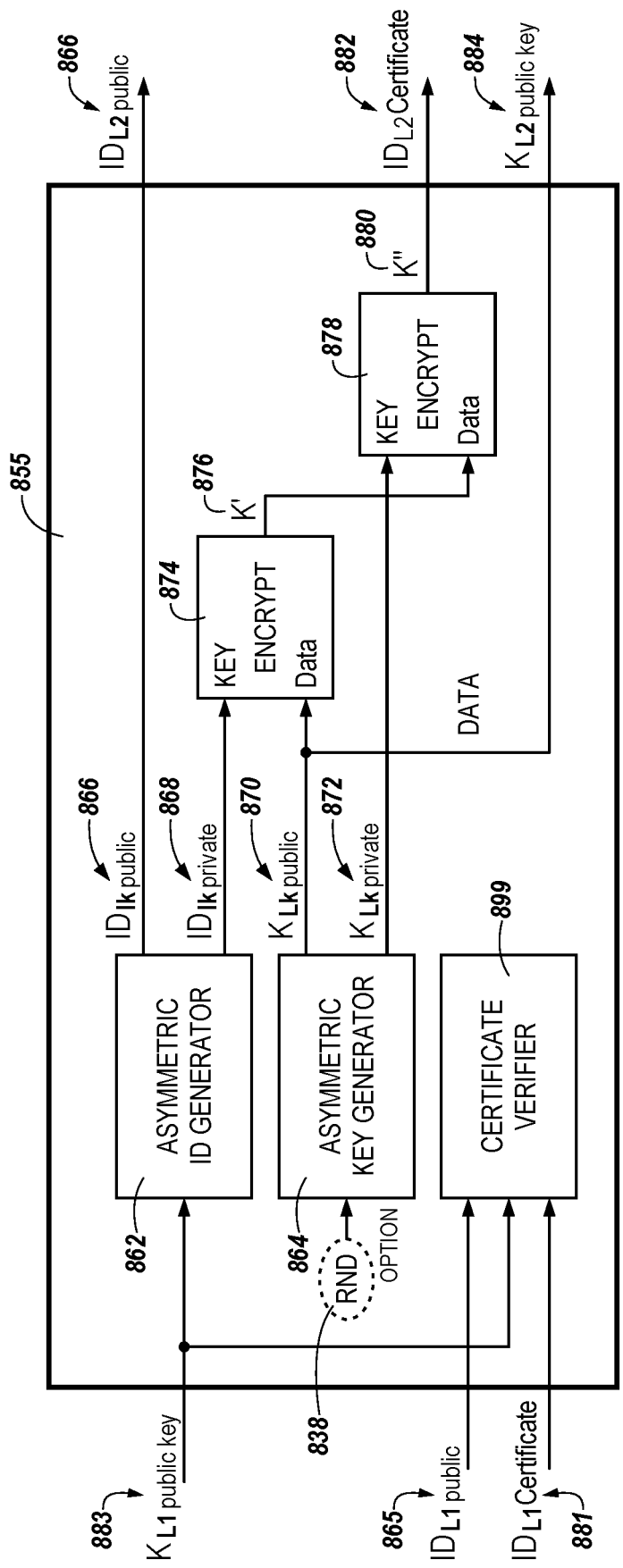
FIG. 8 is a block diagram of an example process to determine a number of parameters in accordance with an embodiment of the present disclosure.

FIG. 8 is a block diagram of an example process to determine a number of parameters in accordance with an embodiment of the present disclosure. FIG. 8 illustrates a Layer 2 855 of a memory device (e.g., memory device 606 in FIG. 6) generating a device identification ("$ID_{L2\ public}$") 866, a device certificate ("$ID_{L2\ Certificate}$") 882, and a device public key ("$K_{L2\ public\ key}$") 884.

The external public key ("$K_{L1\ public\ key}$") 883 transmitted from Layer 1 of the host to Layer 2 855 of a memory device, as described in FIG. 7, is used by an asymmetric ID generator 862 of the memory device to generate a public identification ("$ID_{Lk\ public}$") 866 and a private identification 868 of the memory device. In the abbreviated "$ID_{lk\ public}$," the "lk" indicates Layer k (in this example Layer 2), and the "public" indicates that the identification is openly shared. The public identification 866 is illustrated as shared by the arrow extending to the right and outside Layer 2 855. The generated private identification 868 is used as a key input into an encryptor 874.

As shown in FIG. 8, the external certificate 881 and public identification 865, along with the external public key 883, are used by a certificate verifier 899. The certificate verifier 899 can verify the external certificate 881 received from a host, and determine, in response to the external certificate 881 being verified or not being verified, whether to accept or discard data received from the host. Further details of verifying the external certificate 881 are further described herein (e.g., in connection with FIG. 9).

Layer 2 855 of the memory device can include an asymmetric key generator 864. In at least one example, a random number generator (RND) 838 can optionally input a random number into the asymmetric key generator 864. The asymmetric key generator 864 can generate a public key ("$K_{Lk\ public}$") 870 (referred to as a device public key) and a private key ("$K_{LK\ private}$") 872 (referred to as a device private key) associated with a memory device such as memory device 606 in FIG. 6. The device public key 870 can be an input (as "data") into the encryptor 874. The encryptor 874 can generate a result K' 876 using the inputs of the device private identification 868 and the device public key 870. The device private key 872 and the result K' 876 can be input into an additional encryptor 878, resulting in output K" 880. The output K" 880 is the device certificate ("$ID_{L2\ certificate}$") 882 transmitted back to the Layer 1 (653 of FIG. 6). The device certificate 882 can provide an ability to verify and/or authenticate an origin of data sent from a device. As an example, data sent from the memory device can be associated with an identity of the memory device by verifying the certificate, as will be described further in association with FIG. 9. Further, the device public key ("$K_{L2\ public\ key}$") 884 can be transmitted to Layer 1. Therefore, the public identification 866, the certificate 882, and the device public key 884 of the memory device can be transmitted to Layer 1 of a host.

In an example, in response to a host receiving a public key from a memory device, the host can encrypt data to be sent to the memory device using the device public key. Vice versa, the memory device can encrypt data to be sent to the host using the external public key. In response to the memory device receiving data encrypted using the device public key, the memory device can decrypt the data using its own device private key. Likewise, in response to the host receiving data encrypted using the external public key, the host can decrypt the data using its own external private key. As the device private key is not shared with another device outside the memory device and the external private key is not shared with another device outside the host, the data sent to the memory device and the host remains secure.

Figure 9:
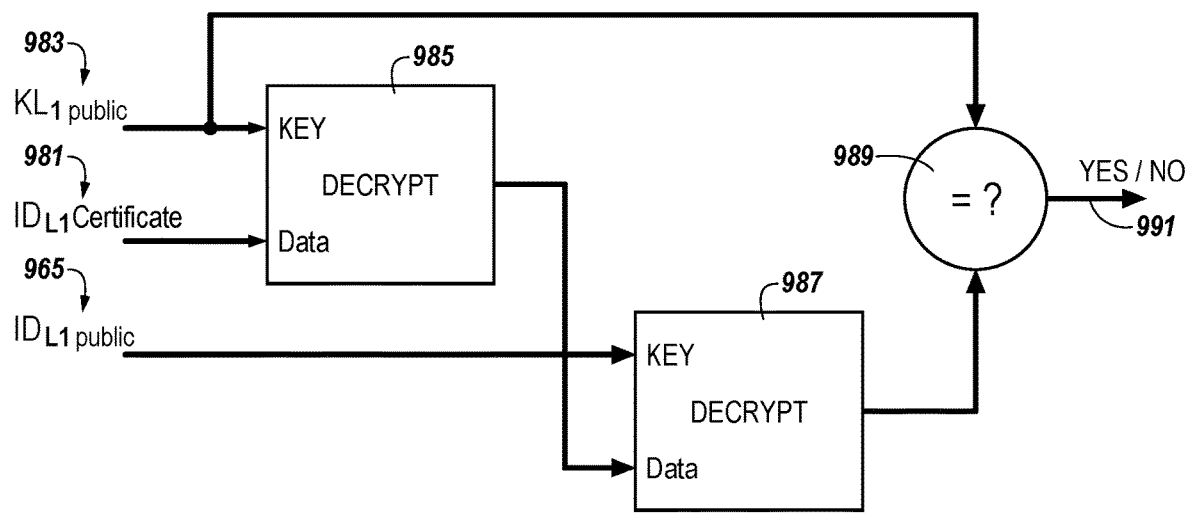
FIG. 9 is a block diagram of an example process to verify a certificate in accordance with an embodiment of the present disclosure.

FIG. 9 is a block diagram of an example process to verify a certificate in accordance with an embodiment of the present disclosure. In the illustrated example of FIG. 9, a public key 983, a certificate 981, and a public identification 965 is provided from a host (e.g., from Layer 1 653 of host 602 in FIG. 6). The data of the certificate 981 and the external public key 983 can be used as inputs into a decryptor 985. The decryptor 985 can be any processor, computing device, etc used to decrypt data. The result of the decryption of the certificate 981 and the external public key 983 can be used as an input into a secondary decryptor 987 along with the public identification, result in an output. The external public key 983 and the output from the decryptor 987 can indicate, as illustrated at 989, whether the certificate is verified, resulting in a yes or no 991 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 10:
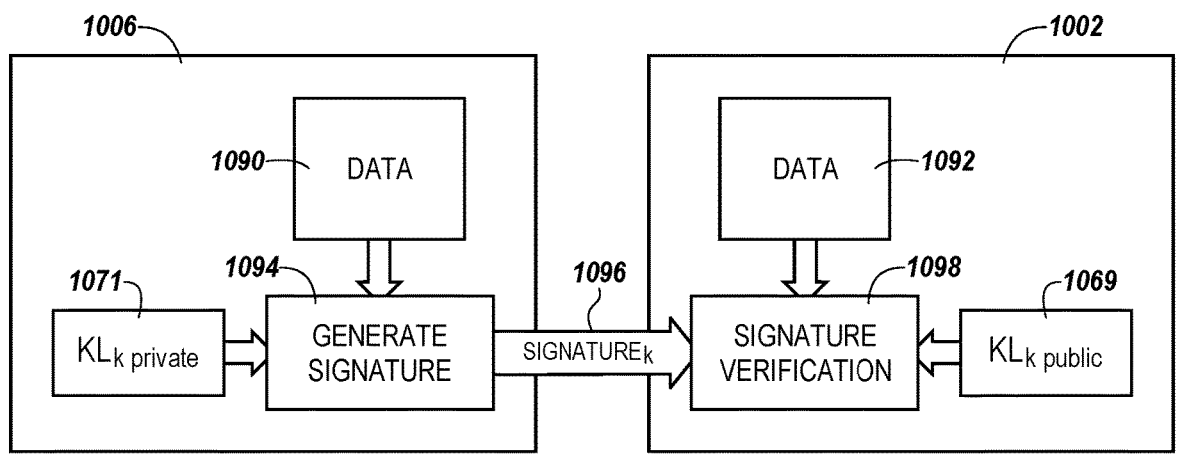
FIG. 10 is a block diagram of an example process to verify a signature in accordance with an embodiment of the present disclosure.

FIG. 10 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A memory device 1006 (such as memory device 206 in FIG. 2) can send data 1090 to a host (such as host 202 in FIG. 2). The memory device 1006 can generate, at 1094, a signature 1096 using a device private key 1071. The signature 1096 can be transmitted to the host 1002. The host 1002 can verify, at 1098, the signature using data 1092 and the external public key 1069 previously received. In this way, the signature is generated using a private key and verified using a public key. In this way, the private key used to generate a unique signature can remain private to the device sending the signature while allowing the receiving device to be able to decrypt the signature using the public key of the sending device for verification. This is in contrast to encryption/decryption of the data, which is encrypted by the sending device using the public key of the receiving device and decrypted by the receiving device using the private key of the receiver. In at least one example, the device can verify the digital signature by using an internal cryptography process (e.g., Elliptical Curve Digital signature (ECDSA) or a similar process.

Figure 11:
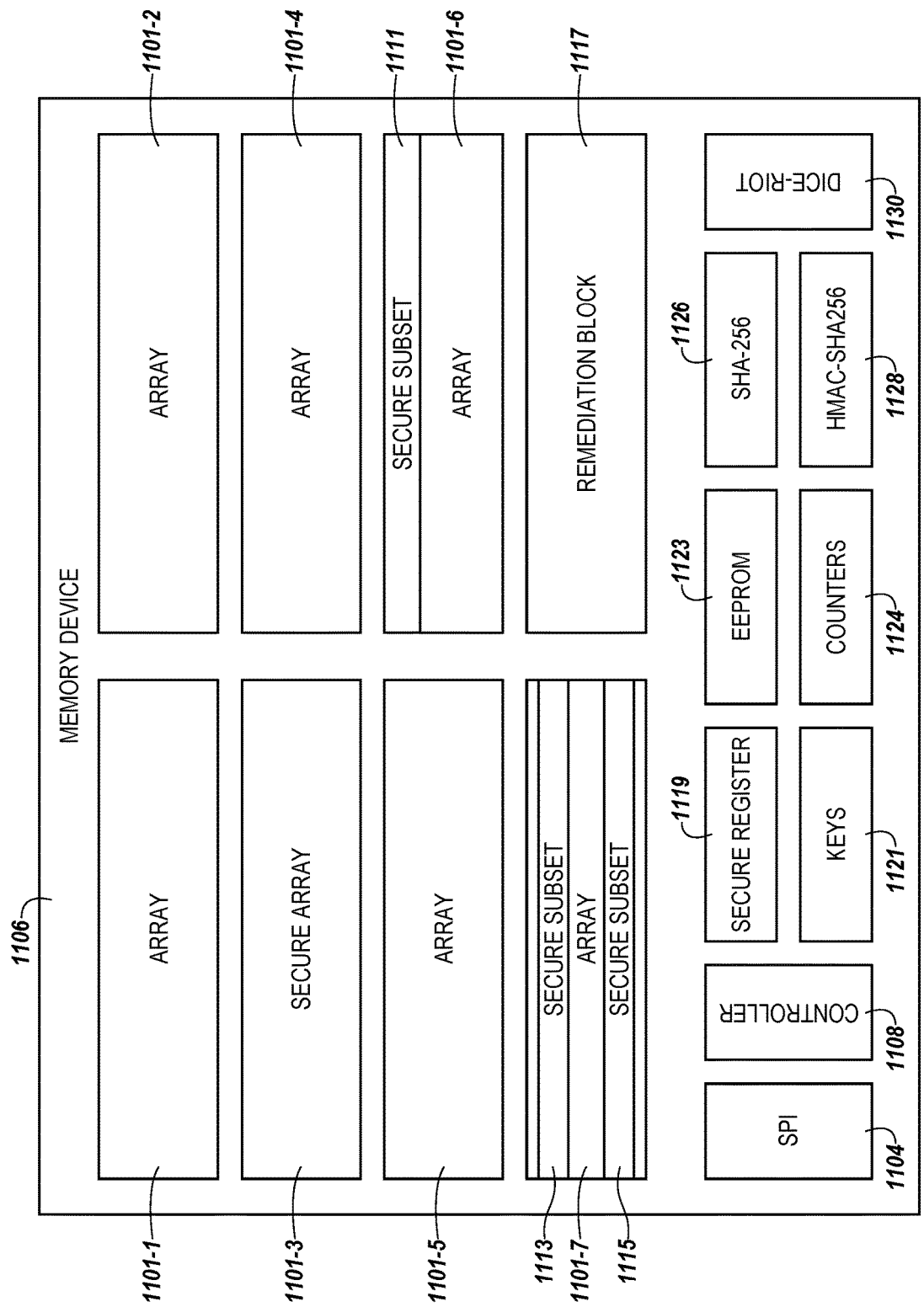
FIG. 11 is a block diagram of an example memory device in accordance with an embodiment of the present disclosure.

FIG. 11 is a block diagram of an example memory device 1106 in accordance with an embodiment of the present disclosure. Memory device 1106 can be, for example, memory device 206 previously described in connection with FIG. 2.

As shown in FIG. 11, memory device 1106 can include a number of memory arrays 1101-1 through 1101-7. Memory arrays 1101-1 through 1101-7 can be analogous to memory array 101 previously described in connection with FIG. 1. Further, in the example illustrated in FIG. 10, memory array 1101-3 is a secure array, subset 1111 of memory array 1101-6 comprises a secure array, and subsets 1113 and 1115 of memory array 1101-7 comprise a secure array. Subsets 1111, 1113, and 1115 can each include, for instance, 4 kilobytes of data. However, embodiments of the present disclosure are not limited to a particular number or arrangement of memory arrays or secure arrays.

As shown in FIG. 11, memory device 1106 can include a remediation (e.g., recovery) block 1117. Remediation block 1117 can be used as a source of data in case of errors (e.g., mismatches) that may occur during operation of memory device 1106 and/or if data stored in arrays 1101-1 through 1101-7 has been determined to not be valid, as previously described herein. Remediation block 1117 may be outside of the area of memory device 1106 that is addressable by a host.

As shown in FIG. 11, memory device 1106 can include a serial peripheral interface (SPI) 1104 and a controller 1108. Memory device 1106 can use SPI 1104 and controller 1108 to communicate with a host and memory arrays 1101-1 through 1101-7, as previously described herein (e.g., in connection with FIG. 2).

As shown in FIG. 11, memory device 1106 can include a secure register 1119 for managing the security of memory device 1106. For example, secure register 1119 can configure, and communicate externally, to an application controller. Further, secure register 1119 may be modifiable by an authentication command.

As shown in FIG. 11, memory device 1106 can include keys 1121. For instance, memory device 1106 can include eight different slots to store keys such as root keys, DICE-RIOT keys, and/or other external session keys.

As shown in FIG. 11, memory device 1106 can include an electronically erasable programmable read-only memory (EEPROM) 1123. EEPROM 1123 can provide a secure non-volatile area available for a host, in which individual bytes of data can be erased and programmed.

As shown in FIG. 11, memory device 1006 can include counters (e.g., monotonic counters) 1124. Counters 1124 can be used as an anti-replay mechanism (e.g., freshness generator) for commands (e.g., to sign a command set or sequence) received from and/or sent to a host. For instance, memory device 1106 can include six different monotonic counters, two of which may be used by memory device 1106 for the authenticated commands, and four of which may be used by the host.

As shown in FIG. 11, memory device 1106 can include an SHA-256 cryptographic hash function 1126, and/or an HMAC-SHA256 cryptographic hash function 1128. SHA-256 and/or HMAC-SHA256 cryptographic hash functions 1126 and 1128 can be used by memory device 1106 to generate cryptographic hashes, such as, for instance, run-time cryptographic hashes and/or golden hashes used to validate the data stored in memory arrays 1101-1 through 1101-7, as previously described herein. Further, memory device 1106 can support L0 and L1 of DICE-RIOT 1130.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory; and
   circuitry configured to validate, during a powering of the memory, data stored in a number of segments of the memory, wherein:
   each respective segment is associated with a different cryptographic hash; and
   the data stored in each respective one of the number of segments is validated using the cryptographic hash associated with that respective segment.

2. The apparatus of claim 1, wherein the circuitry is configured to validate, after the powering of the memory, data stored in an additional number of segments of the memory, wherein:
   each respective one of the additional number of segments is associated with a different cryptographic hash; and
   the data stored in each respective one of the additional number of segments is validated using the cryptographic hash associated with that respective segment.

3. The apparatus of claim 1, wherein the circuitry is configured to validate the data stored in each respective one of the number of segments by comparing the cryptographic hash associated with that respective segment to a run-time cryptographic hash for the data stored in that respective segment.

4. The apparatus of claim 3, wherein the circuitry is configured to validate the data stored in each respective one of the number of segments upon the comparison indicating the cryptographic hash associated with that respective segment matches the run-time cryptographic hash for the data stored in that respective segment.

5. The apparatus of claim 3, wherein the circuitry is configured to remediate the data stored in each respective one of the number of segments upon the comparison indicating the cryptographic hash associated with that respective segment does not match the run-time cryptographic hash for the data stored in that respective segment.

6. The apparatus of claim 1, wherein the circuitry is configured to send the data stored in each respective one of the number of segments to a host upon validating the data stored in that respective segment.

7. The apparatus of claim 1, wherein the apparatus includes a register configured to define an address of each respective one of the number of segments.

8. The apparatus of claim 1, wherein the apparatus includes a register configured to define a size of each respective one of the number of segments.

9. A method of operating memory, comprising:
powering a memory; and
validating, during the powering of the memory, data stored in a number of segments of the memory, wherein:
 each respective one of the number of segments is associated with a different cryptographic hash; and
 the data stored in each respective one of the number of segments is validated using the cryptographic hash associated with that respective segment; and
validating, after the powering of the memory, data stored in an additional number of segments of the memory, wherein:
 each respective one of the additional number of segments is associated with a different cryptographic hash; and
 the data stored in each respective one of the additional number of segments is validated using the cryptographic hash associated with that respective segment.

10. The method of claim 9, wherein the method includes dividing the memory into the number of segments and the additional number of segments.

11. The method of claim 9, wherein the method includes:
generating, after the powering of the memory, a different run-time cryptographic hash for the data stored in each respective one of the additional number of segments; and
validating the data stored in each respective one of the additional number of segments by comparing the run-time cryptographic hash generated for the data stored in that respective segment to the cryptographic hash associated with that respective segment.

12. An apparatus, comprising:
a memory; and
circuitry configured to:
 validate, during a powering of the memory, data stored in each respective one of a first number of segments of the memory using a cryptographic hash associated with that respective segment; and
 validate, after the powering of the memory, data stored in each respective one of a second number of segments of the memory using a cryptographic hash associated with that respective segment.

13. The apparatus of claim 12, wherein each respective one of the first number of segments and each respective one of the second number of segments are associated with a different cryptographic hash.

14. The apparatus of claim 12, wherein the circuitry is configured to:
send the data stored in each respective one of the first number of segments to a host upon validating the data stored in that respective segment; and
send the data stored in each respective one of the second number of segments to the host upon validating the data stored in that respective segment.

15. The apparatus of claim 14, wherein the apparatus is configured to validate the data stored in each respective one of the second number of segments while sending the data stored in each respective one of the first number of segments to the host.

16. The apparatus of claim 14, wherein the circuitry is configured to send the data stored in each respective one of the second number of segments to the host after sending the data stored in each respective one of the first number of segments to the host.

17. The apparatus of claim 12, wherein the apparatus includes a register configured to provide an indication of:
a status of the validation of the data stored in each respective one of the first number of segments; and
a status of the validation of the data stored in each respective one of the second number of segments.

18. The apparatus of claim 12, wherein the apparatus includes a register configured to provide an indication of:
a result of the validation of the data stored in each respective one of the first number of segments; and
a result of the validation of the data stored in each respective one of the second number of segments.

19. The apparatus of claim 12, wherein the apparatus includes a register configured to provide an indication of:
whether a remediation of the data stored in each respective one of the first number of segments is allowed; and
whether a remediation of the data stored in each respective one of the second number of segments is allowed.

* * * * *